April 7, 1925.  
H. N. ATWOOD  
COMPOSITE VEHICLE WHEEL  
Filed April 25, 1924
1,532,977
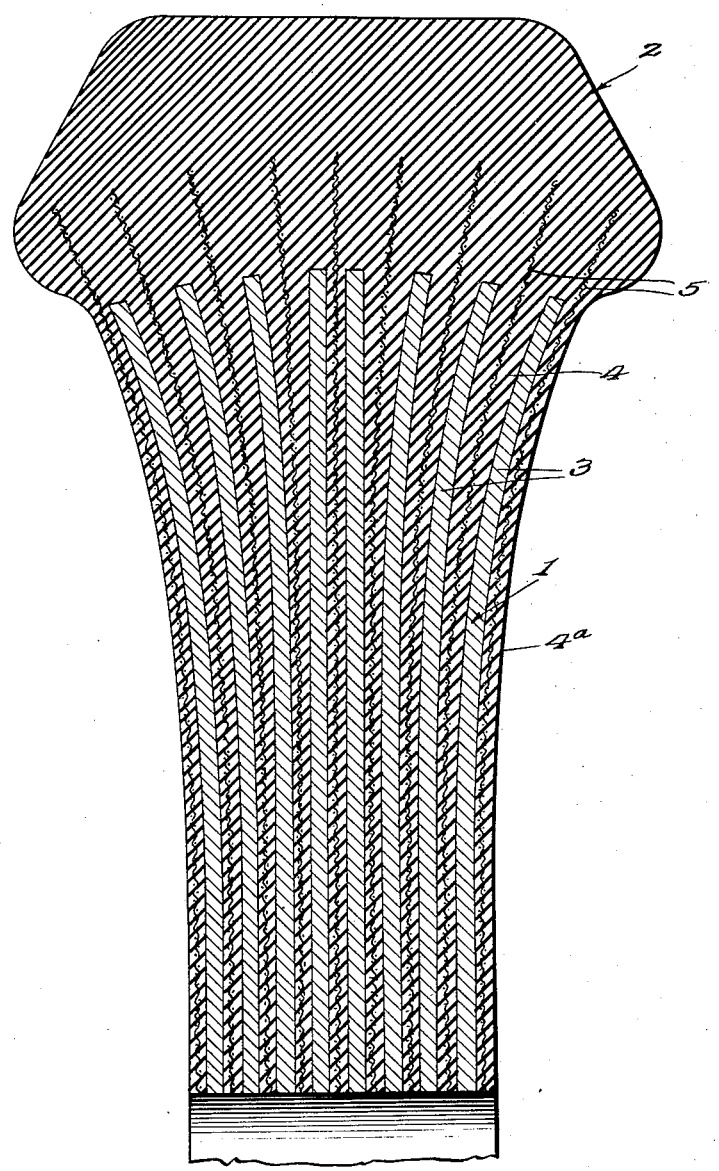
Inventor  
Harry N. Atwood.  
By Lacey Lacey, Attorneys Patented Apr. 7, 1925.

1,532,977

UNITED STATES PATENT OFFICE.

HARRY N. ATWOOD, OF MONSON, MASSACHUSETTS, ASSIGNOR TO RUBWOOD, INC., OF LAWRENCE, MASSACHUSETTS, A CORPORATION OF MASSACHUSETTS.

COMPOSITE VEHICLE WHEEL.

Application filed April 25, 1924. Serial No. 708,941.

*To all whom it may concern:*

Be it known that I, HARRY N. ATWOOD, a citizen of the United States, residing at Monson, in the county of Hampden and State of Massachusetts, have invented certain new and useful Improvements in Composite Vehicle Wheels, of which the following is a specification.

This invention relates to improvements in composite vehicle wheels of the type disclosed in my Patent 1,458,379 issued June 12, 1923. In accordance with the said patent the wheel is made up of a plurality of plies of veneer, intervening bonding plies of rubber material, and a tread likewise of rubber material and integrally and permanently united by a process of vulcanization to the bonding plies of the wheel body so that the structure constitutes a composite whole. Likewise in accordance with the prior invention, the veneer plies, which are of circular form have their peripheral portions dished or outwardly curved in the direction of the adjacent faces of the body of the structure to render the tread supporting portion of the body more resilient and of sufficient width to provide the required width of tread. One of the objects of the present invention is to reinforce the connection between the tread and the body, so that while in the previously patented structure the tread is integrally united by a process of vulvanization to the rubber bonding plies of the body, in the present invention this union is strengthened by the presence of reinforcing plies arranged in a manner to most effectually perform their function, the structure being, due to their presence, rendered much more substantial and durable.

Another important object of the invention is to provide, in a tire constructed as generally outlined above, means for stabilizing the tread so that it will be prevented from shifting laterally with relation to the periphery of the wheel body as, for example, when subjected to lateral stresses in turning corners and under other conditions of travel.

Another object of the invention is to so arrange the supplemental reinforcing means above referred to that, during the course of manufacture of the wheel, it will serve the useful purpose of enabling the tread to be more readily built up about the wheel body proper.

The figure of the accompanying drawing is a diametric sectional view of a portion of a vehicle constructed in accordance with the invention.

While the wheel embodying the invention comprises a composite integral whole, it may in fact be said to consist of a body which is indicated in the drawing in general by the numeral 1, and a tread indicated in general by the numeral 2. The body 1 is of laminated structure and comprises a plurality of veneer plies indicated by the numeral 3, and intervening plies 4 of rubber, the latter plies constituting bonding plies and uniting the veneer plies 3. The veneer plies 3 are of disc-like form and when properly arranged, the grain in adjacent plies will run in non-corresponding directions so as to secure the greatest possible degree of reinforcement and render the wheel uniformly resistant to stresses which would tend to split it. The veneer plies 3 and rubber bonding plies 4 are alternately disposed so that the plies 4 serve not only as a shock-absorbing medium but also as a means for bonding together the said plies 3. The outermost ones of the plies 4, indicated specifically by the numeral 4$^a$, are united to the outer faces of the outermost ones of the veneer plies 3 so as to constitute facing surfaces for the wheel body. It is customary to form the felly of a vehicle wheel of a width or thickness greater than the thickness of the body at the hub, and therefore in the present invention this practice is followed by forming the bonding plies 4 of gradually increasing thickness in the direction of their peripheries. As a consequence the veneer plies are caused to assume a dished or outwardly curved form between their mid- and peripheral portions, unless the plies are formed to this shape prior to assemblage with the said bonding plies. In any event the veneer plies will be arranged in what may be considered as two sets, the plies at the central line of the wheel being substantially flat and occupying substantially parallel planes, and the peripheral portions of the other plies being given a curved form of increasing degree in the direction of the side faces of the body of the wheel.

The tread 2 is built up from an integral mass of rubber which, in the course of manufacture of the wheel, is applied about the periphery of the body and roughly shaped to the required form, and at the time of preparing the plies 4, reinforcing plies 5 of fabric or rubberized fabric are embedded therein. These plies of fabric have their peripheral portions extended beyond the peripheries of the plies 4, or, more specifically, beyond the peripheries of the veneer plies, so that when the rubber tread 2 is built up upon the periphery of the body of the wheel, the projecting peripheral portions of the said plies 5 will become embedded in the material of the tread. After the component parts of the structure have been assembled, the assemblage is placed within a suitable mold and subjected to heat and pressure, as a consequence of which treatment the rubber will be vulcanized and the plies 4 will become intimately united to the veneer plies 3 and will bond the latter plies together so that the resulting structure will constitute an integral whole. It will be evident that by forming the reinforcing plies 5 of a diameter greater than the rubber plies in which they are embedded and likewise of a diameter greater than the veneer plies, the projecting peripheral portions of the reinforcing plies will constitute means assisting materially in the building up of the tread 2 about the periphery of the body.

Not only do the reinforcing plies 5 and their projecting peripheral portions, particularly, serve the purpose above described, but they serve also to materially reinforce the structure as a whole and especially to reinforce the union of the tread with the periphery of the body and to prevent any lateral distortion or displacement of the tread under sidewise stresses.

Having thus described the invention, what is claimed as new is:

1. A vehicle wheel having a tread of cushioning material and a body made up of plies of veneer bonded together by cushioning material, the tread and body of the wheel being integrally united, and reinforcing plies embedded in the bonding cushioning material between the plies of veneer and having peripheral portions extending into the tread.

2. A vehicle wheel having a tread of cushioning material and a body made up of plies of veneer bonded together by cushioning material, the tread and body of the wheel being integrally united, and reinforcing plies of fabric material embedded in the bonding cushioning material between the veneer plies and having portions extending into the tread and embedded therein.

3. A vehicle wheel comprising a body and tread, the body being made up of plies of veneer and plies of rubber bonding material, the tread being also of rubber material and integrally united with the last mentioned plies of the body, and reinforcing plies embedded in the plies of rubber material and having portions extending into the tread.

4. A vehicle wheel comprising a body and tread, the body being made up of plies of veneer and plies of rubber bonding material, the tread being also of rubber material and integrally united with the last mentioned plies of the body, and reinforcing plies embedded in the bonding plies of rubber material and having their peripheries extending into and embedded in the tread.

5. A vehicle wheel comprising a body and tread, the body being made up of plies of veneer and plies of rubber bonding material, the tread being also of rubber material and integrally united with the last mentioned plies of the body, and reinforcing plies embedded in the rubber bonding plies and having their peripheral portions extending beyond the peripheries of the veneer plies and into the tread.

6. A vehicle wheel comprising a body and tread, the body being made up of plies of veneer and bonding plies of rubber, the tread being likewise of rubber and constituting an integral part with the rubber bonding plies of the body, and reinforcing plies of fabric material embedded in the rubber bonding plies between the veneer plies and extending into the tread.

7. A vehicle wheel comprising a body and tread, the body being made up of plies of veneer and bonding plies of rubber, the tread being likewise of rubber and constituting an integral part with the rubber bonding plies of the body, and plies of fabric material embedded in the rubber bonding plies between the veneer plies and having their peripheral portions extending continuously beyond the peripheries of the veneer plies and embedded in the tread.

In testimony whereof I affix my signature.

HARRY N. ATWOOD. [L. S.]